Dec. 22, 1964 M. W. GATES, JR 3,162,081

APPARATUS AND METHOD FOR SPLICING TAPE HAVING MEANS FOR LOCATING MAGNETIC PARTICLES ON THE TAPE

Filed Dec. 7, 1959 3 Sheets-Sheet 1

INVENTOR.
MYRON W. GATES JR.
BY Fulwider Mattingly & Huntley
Attorneys

INVENTOR.
MYRON W. GATES JR.

BY Fulwider Mattingly & Huntley
Attorneys

INVENTOR.
MYRON W. GATES JR.
BY Fulwider Mattingly & Huntley
Attorneys

United States Patent Office 3,162,081

Patented Dec. 22, 1964

3,162,081

APPARATUS AND METHOD FOR SPLICING TAPE HAVING MEANS FOR LOCATING MAGNETIC PARTICLES ON THE TAPE

Myron W. Gates, Jr., 15183 Encanto Drive, Sherman Oaks, Calif.

Filed Dec. 7, 1959, Ser. No. 857,627
12 Claims. (Cl. 83—456)

This invention relates to magnetic recording media, and more particularly to a unique method and apparatus used in editing material recorded on magnetic tape, such as tape used for recording in television systems.

Video tape, so-called, is used for television recording, such as "live" shows, sports events and the like, and scenes enacted in studios and outdoors for plays and commercials. Such tape recordings are later used in transmitting the material for viewing on home television sets.

After material has been recorded thereon, the tape is edited. Such editing is done for several reasons, the most important of which is time. Generally, predetermined amounts of time are allotted for commercials and for the "main show." Portions of tapes on which both of these types of materials are recorded must be removed so that what remains will fit within the allotted time. After editing the individual tape recordings, further editing is done to make a composite tape wherein the sections on which the commercials are recorded are inserted at selected intervals.

In all such editing procedures, tapes are cut and joined together, as with splicing tape. And, after a video tape has been made up in this manner, it is often necessary subsequently to edit the tape and insert other lengths of tape on which other commercials, for example, are recorded. This occasionally happens where a particular show is to constitute a "re-run" that is sponsored by different persons, groups, or organizations than the sponsors of the original show. The original commercials are cut from the remainder of the tape and replaced with the lengths on which the different commercials are recorded. Again, the ends of each length must be spliced with the ends of the sections between which it is located.

On "playback" of a video tape, for the purpose of transmitting the video signals recorded thereon, it is essential that the tape travel at a constant speed in the playback mechanism. To facilitate such speed control during transmission, a synchronizing signal is recorded adjacent one edge of the tape while the video signals are being recorded thereon.

The synchronizing signal is a cyclical signal of predetermined frequency that appears on the various sections of tape that are to be spliced together. The playback control mechanism responds to the synchronizing signal to feed the tape at the speed dictated thereby. If the synchronizing signals on sections of tape that are spliced together are not "matched," the playback mechanism "sees" the mismatching as a shift in the position, or phase, of the synchronizing signal, and hence as a command to change tape speed momentarily. The desired constant speed for tape travel is resumed as soon as possible. However, during the few seconds in which the tape speed is varying, the video signals are transmitted at correspondingly varying speed. On home television sets, this is seen as a "roll-over," or blurring of scenes.

To help minimize these problems, the tape also has equally spaced "editing" pulses recorded thereon during recording of video signals. Such pulses are located along the same edge portion as the synchronizing signal, and are so spaced that if two sections of tape are joined with editing pulses matched precisely, the synchronizing signals recorded thereon are also matched precisely.

Prior art apparatus and practices for splicing video tape require an enormous amount of time and effort to make a good splice, i.e., one that is properly located so that the spacing of the editing pulses is maintained. Preparatory to making a splice, the edge portions of the tape on which the editing pulses are located are "exposed" by coating the edges thereof with a suitable material that exposes the editing pulses to view. Unfortunately, the editing pulses are quite narrow, being of the order of 0.004" in width, and are therefore quite difficult to observe. If, as occasionally happens, the material is not applied properly, or is not of the proper consistency, the editing pulses cannot be seen clearly. Such mistakes require that the exposure procedure be repeated.

After the edge portions of the ends of the tapes to be spliced have been exposed, so that the editing pulses can be seen, the ends of the tapes are placed on a platform support. Then the operator attempts to align an editing pulse on one tape with an index mark. After he obtains what he thinks is the proper alignment of the mark and the editing pulse, he cuts across the tape, as with a razor blade. After doing the same thing for the other tape, the ends of the tapes are placed together and secured, as by placing strips of aluminum tape across their ends.

After a tape is made up in this tedious manner, the only way to check the correctness of the numerous splices is to view the show, as by transmitting it on a closed-circuit television system at the studio. Any defects noted as a result of errors in splicing can then be corrected by changing the objectionable splices. This procedure is time consuming and expensive, and deadlines and limited budgets often dictate that a show be put on without making desired changes.

As will be apparent, highly skilled and experienced persons are needed to perform the various operations needed for splicing video tape. Even so, it requires up to thirty minutes for such a person to make a single splice. This means that several hours are consumed in making the number of splices required for a television show of, say, one-half hour in length. Thus, the acts of cutting and splicing video tape contribute measurably to the over-all expense of producing a television show, and this in spite of the fact that there can be absolutely no assurance that any one of the splices made is perfectly accurate.

It is an object of my invention to provide a method and means for splicing magnetic tape that overcomes the above and other disadvantages of the prior art.

It is another object of my invention to provide a unique method and apparatus for splicing video tape, which entirely eliminates guesswork.

A further object of my invention is to provide a unique method and apparatus for automatically cutting and placing the ends of tapes in abutment for forming a butt-end splice.

A still further object of my invention is to provide a unique electronic system for determining the proper spacing of editing pulses in the vicinity of a splice made between two adjacent tapes.

It is also an object of my invention to provide a unique system for automatically and accurately checking the spacing of pulses in the vicinty of a splice of video tapes secured together.

It is still another object of my invention to provide a unique method and apparatus for determining the proper location of a splice for securing the ends of a pair of video tapes together, which comprises a minimum number of component parts of simple design and rugged construction.

The above and other objects and advantages of my invention will become apparent from the following description taken in conjunction with the accompanying drawings of an illustrative embodiment thereof, in which.

Figures 7A, 7B, 7C, 7D:
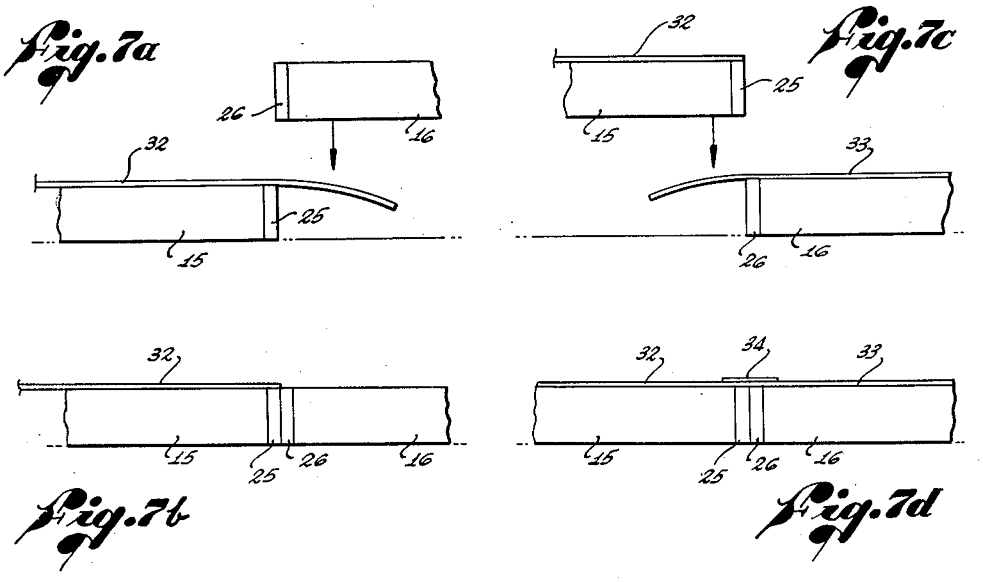
Figure 8:
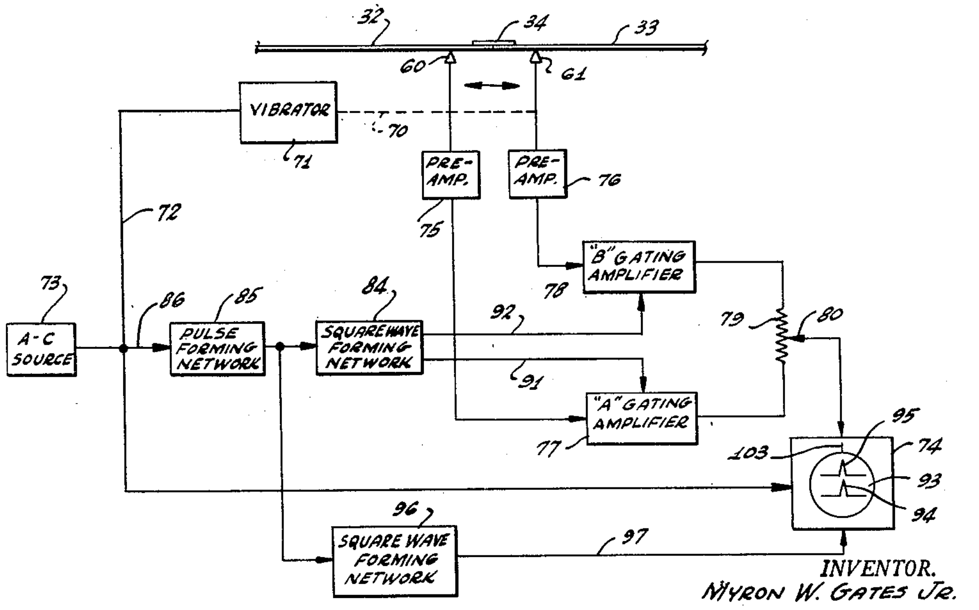
Figures 9A, 9B, 9C, 9D, 9E, 9F, 9G, 9H:
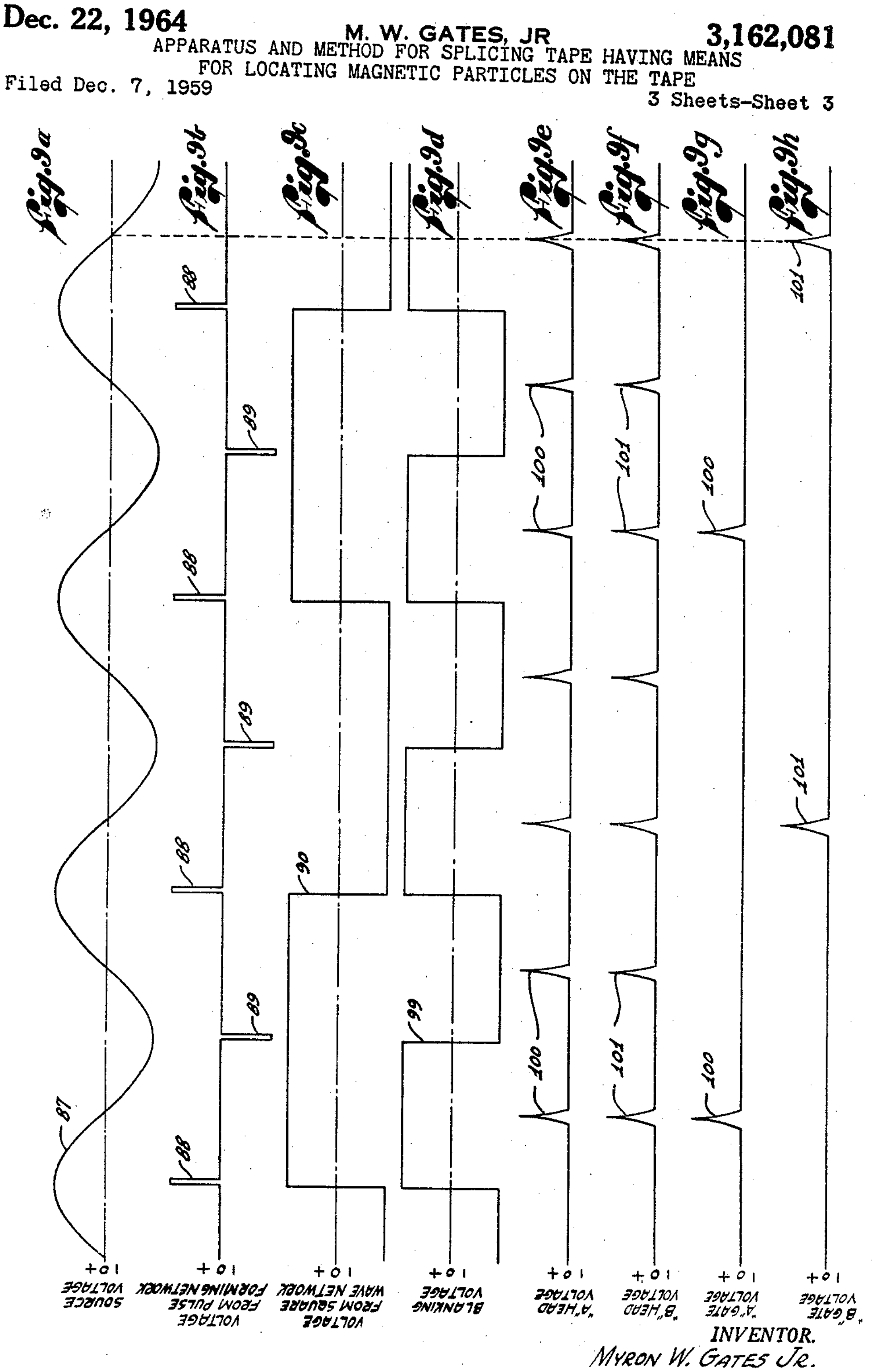

FIGURE 7*a* is a schematic diagram of my cutting apparatus, showing one bed raised above the other and a length of tape extending beyond the end of the other bed;

FIGURE 7*b* shows the beds in position wherein the end of the tape shown in FIGURE 7*a* has been cut off;

FIGURE 7*c* is a schematic diagram, similar to FIGURE 7*a,* wherein the previously cut tape is retained on its bed, such bed being raised and a length of tape extending beyond the other bed;

FIGURE 7*d* is a schematic diagram, similar to FIGURE 7*b*, showing the beds in position after the tape of FIGURE 7*c* has been cut, whereby the ends of the tapes are in abutment, and showing a strip of splicing tape overlaying the adjacent ends of the tapes to thereby provide a butt-end splice;

FIGURE 8 is a block diagram of my unique system for effecting the vibration of the pickup heads and determining therefrom the proper location of the editing pulses;

FIGURE 9*a* is a graph of the waveform of a voltage from the A.C. source, which is applied to the vibrator and to the sweep control circuit of the oscilloscope;

FIGURE 9*b* is a graph of the waveform of the voltage pulses from the pulse-forming network;

FIGURE 9*c* is a graph of the waveform of the voltage developed by one square wave network;

FIGURE 9*d* is a graph of the waveform of the blanking voltage;

FIGURES 9*e* and 9*f* are graphs of the waveforms of the voltage pulses developed by the vibrating pickup heads;

FIGURE 9*g* is a graph of the waveform of the voltage pulses developed in the output of the gating amplifier coupled to one of the pickup heads; and FIGURE 9*h* is a graph of the waveform of the voltage pulses in the output of the gating amplifier coupled to the other pickup head.

Figure 1:
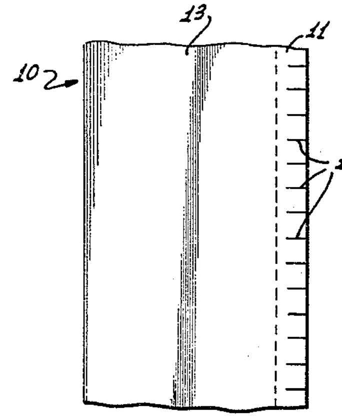
FIGURE 1 is a fragmentary plan view of a strip of video tape, showing the location of editing pulses along one marginal edge portion thereof.

Referring to FIGURE 1, there is shown a portion of a strip 10 of conventional video tape. The strip 10 has a narrow zone 11 along one edge on which are recorded equally spaced editing pulses 12. The remaining width of the tape, indicated at 13, has the conventional video tracks (not shown) recorded thereon.

Figures 2, 3:
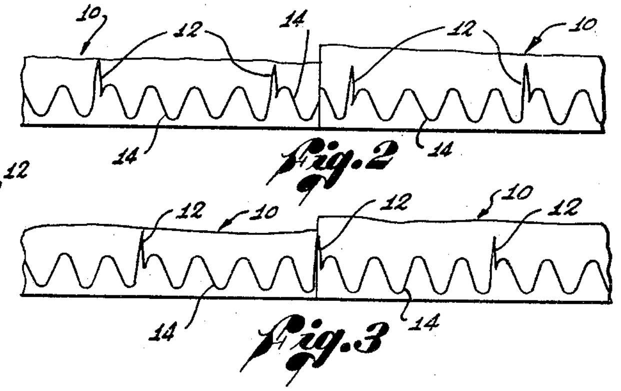
FIGURES 2 and 3 are fragmentary top plan views of a pair of tapes in end abutting relation, showing schematically the effect on the continuity of the synchronizing signal of improperly and properly spaced editing pulses.

As previously mentioned, a cyclical synchronizing signal is also recorded along the edge portion 11. Referring to FIGURE 2, a pair of tapes 10 having their ends in abutment are shown on an enlarged scale to illustrate the spacing of the editing pulses 12 relative to a synchronizing signal 14. It will be understood that the editing pulses 12 and the synchronizing signal 14 are illustrated as the electrical representations of the actual flux lines on the tapes. The signal 14 is shown to be sinusoidal and as having, by way of example, four complete cycles between adjacent editing pulses. Further, each editing pulse is located at the same part of the signal 14, e.g., as shown, where one cycle terminates and the next cycle begins.

The abutting ends of the tapes 10 in FIGURE 2 are shown located so that adjacent editing pulses 12 on either side of the line of engagement are less than four cycles apart. Also, the line of engagement is one wherein the beginning and end of successive cycles of the signals 14 do not meet. This situation represents the phase shift previously mentioned. A pickup head in a playback mechanism would cause a control signal for regulating tape speed to command a change in tape speed momentarily in response to such phase shift.

FIGURE 3 illustrates the desired arrangement of the signals 14 on the tapes 10 at their ends. In the particular arrangement shown, the end of each tape terminates on an editing pulse 12, and in such a manner that the beginning of one cycle of the signal 14 on one tape coincides with the end of that tape, and the end of a cycle of the signal 14 on the other tape coincides with the end thereof. Accordingly, if the ends of the tapes are spliced together, the desired continuity of the signals 14 thereon is assured The practice heretofore has been to try and cut along an editing pulse, because such a pulse was the only mark which an operator could follow in making a cut. However, in my invention, the strips to be joined may be cut along lines either on or intermediate editing pulses.

Figures 4, 5, 6:
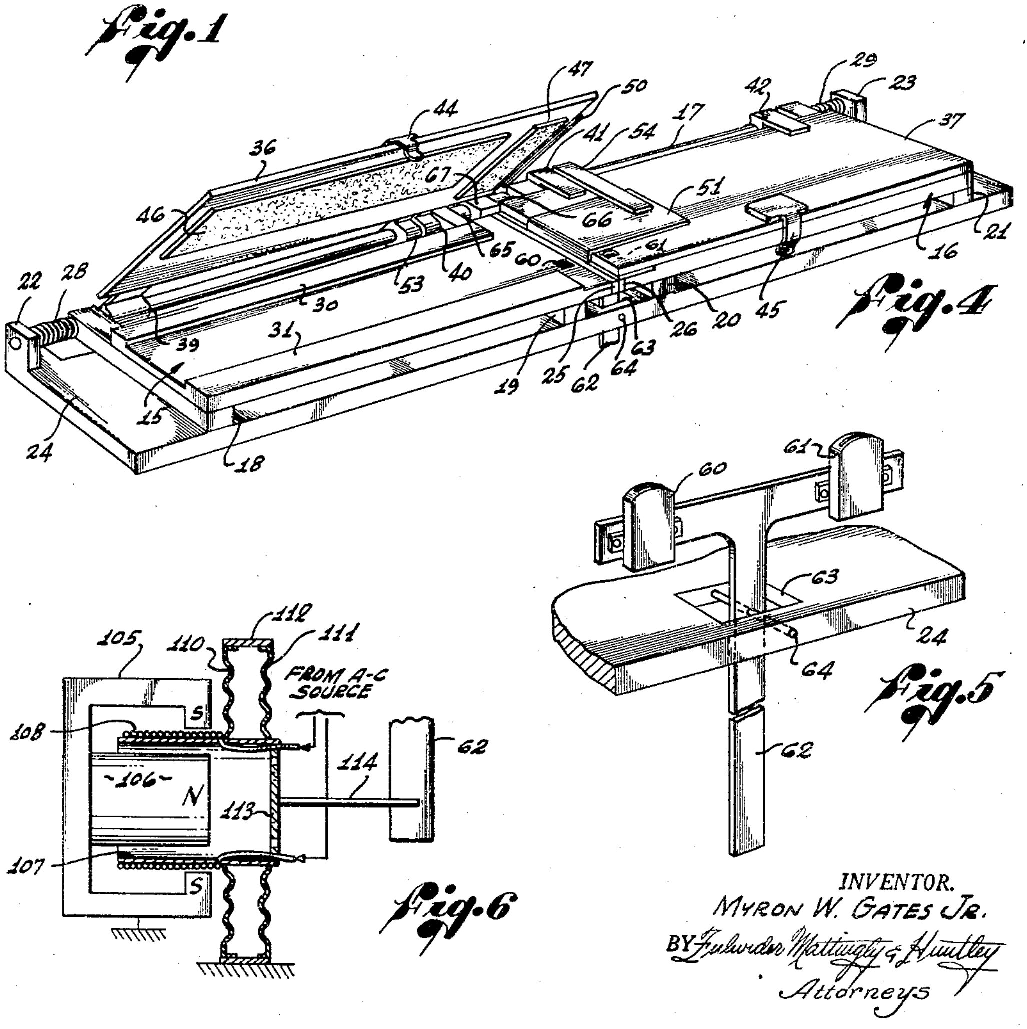
FIGURE 4 is a perspective view of my tape supporting and cutting apparatus, showing the location of the magnetic pickup heads used to obtain the indications of the proper locations of the editing pulses.
FIGURE 5 is a fragmentary perspective view of the support for the pickups, showing the support pivotally mounted adjacent its upper end.
FIGURE 6 is a combined sectional view and schematic diagram of one form of vibratory apparatus in accordance with my invention for vibrating the pickup heads at a predetermined frequency.

Referring to FIGURE 4, my apparatus includes a pair of aligned rectangular beds 15, 16, that are adapted for pivotal movement, at one edge on a common shaft 17. For such pivotal movement, the beds 15, 16 are supported adjacent their ends on respective pairs of arms 18, 19 and 20, 21. The arms 18, 19 and 20, 21 extend at one end past the edges of the beds 15, 16, and are located on shaft 17 as shown. The ends of the shaft 17 are held in supports 22, 23 extending upwardly from a base plate 24.

The arms 18, 19 and 20, 21 cooperate with the base plate 24 to ensure that the beds 15, 16 are normally in precise horizontal alignment. In this connection, the arms are dimensioned so that when they are resting on the base plate 24, the upper surfaces of the beds 15, 16 are in the same plane.

The confronting ends of the beds 15, 16 are arranged for cutting tapes. For this purpose, the end faces of the beds 15, 16 are formed of rectangular plates 25, 26 of hardened material, such as hardened steel. The confronting surfaces of the plates 25, 26 are flat, and their upper and lower corners are sharp. With this arrangement, my apparatus operates so that one of the beds can be raised from the base plate 24, by pivoting it on the shaft 17, and then lowered so that the lower corner of the cutter plate thereon rubs or wipes against the upper corner of the cutter plate on the other bed. This scissors action is utilized to cut a tape that overlays the cutter plate of the bed that is held stationary.

To aid in effecting this cutting operation, the cutter plates 25, 26 are arranged so that, when both beds 15, 16 are resting on the base plate 24, the ends of the cutter plates 25, 26 adjacent the shaft 17 are slightly spaced, and their opposite ends are in engagement. A pair of compressed springs 28, 29 are provided around the shaft 17, intermediate the supports 22, 23 and the arms 18, 21 at the remote ends of the beds 15, 16. When one of the beds is raised relative to the other, the spring engaging the raised bed urges it along the shaft 17 toward the other bed until the rear end of its cutter plate engages the rear end of the other cutter plate. When the raised bed is lowered, the spring action results in the moving cutter plate contacting the fixed cutter plate at a point that travels toward their outer ends as they are brought together.

The beds 15, 16 are adapted to guidably receive lengths of video tape. For example, and as shown for the bed 15, rail portions 30, 31 on the bed surface are spaced apart a distance equal to the width of the video tape.

To cut a length of tape 32 (see FIGURE 7*a* along with FIGURE 4), the end thereof is located on the bed surface between the rails 30, 31. The other bed 16 is pivoted to a raised position, to permit the end of the tape 32 to extend over the cutter plate 25. With the tape 32 in this position, the bed 16 is lowered to cut the tape 32 so that the end thereof lies in the plane of the end surface of the cutter plate 25 (see FIGURE 7*b*).

To join another tape 33 (see FIGURES 7*c* and 7*d*) to the tape 32, the tape 33 is positioned on the bed 16. Then the bed 15 is raised relative to the bed 16, with the tape 32 being retained in position on the bed 15. The end of the tape 33 then extends past the cutter plate 26. The bed 15 is then lowered, thereby causing the end of the tape 33 extending past the cutter head 26 to be sheared off. When the bed 15 reaches the position wherein its upper surface is in the same plane with the upper surface of the bed 16, the ends of the tapes 32, 33 are in abutment. Thereupon, strip 34 of splicing tape is applied to the upper surfaces of the tapes 32, 33 whereby to form a butt-end splice.

My apparatus also provides means to ensure that tapes placed on the beds 15, 16 are held in place. Referring to FIGURE 4, I provide cover plates 36, 37 that are pivotally mounted on the shaft 17, as by supporting the plates 15, 16 on members 39, 40 located between and abutting the arms 18, 19 and members 41, 42 disposed between and bearing against the arms 20, 21. At their opposite edges, the plates 36, 37 are releasably locked to the beds 15, 16 with clip elements 44, 45. As shown for the cover plate 36, the inner surfaces of the cover plates are provided with lengths of cushioning material, as indicated at 46, 47, that are adapted to engage the upper surface of the tape located on the bed when the cover plate 36 is lowered.

My apparatus also includes means for each bed for holding the end of a tape against its cutter plate. To this end, I provide plates 50, 51 that are pivotally mounted relative to the cover plates 36, 37, as on members 53, 54 disposed on the shaft 17. As shown, the ends of the plates 50, 51 extend beyond the ends of the cover plates 36, 37. The ends of the plates 50, 51 curve so that, as shown for the plate 51, when the cover plate 37 is locked to its bed 16, and the plate 51 is lowered, the end of the plate 51 engages the top surface of the cutter plate 26. With the plates 50, 51 held against the cutter plates 25, 26, as by spring-biasing or other suitable means, I prevent a tape from creeping while it is being sheared.

In addition to providing the butt-end splices of video tape, my invention also operates to ensure that the synchronizing signal 14 (of FIGURES 2 and 3), across the splice is not shifted in phase. Referring to FIGURES 4–6 and 8, I provide spaced magnetic pickup heads 60, 61 that extend through openings in the beds 15, 16 to the upper surfaces thereof. The pickups are positioned so that each is aligned with an edge portion of a tape placed on its bed. As shown in FIGURES 4 and 5, the pickups 60, 61 are secured at the ends of the cross bar of a T-shaped element 62 that extends through an opening 63 in the base plate 24, and which is pivotally mounted adjacent its upper end on the base plate, as on a pin 64 extending through the opening 63. The pickups 60, 61 are positioned on the T-shaped element 62 so that the distance between the centers of the heads is precisely the distance covered by a predetermined number of editing pulses on the video tape.

To position the beds 15, 16, I employ spacer sleeves 65, 66 on the shaft 17 (see FIGURE 4) that are separated by a block 67 that is slidable on the shaft 17. The block 67 and the sleeves 65, 66 are chosen to position the beds so that the cutter plates 25, 26 will cut tapes along any desired line. The sleeves 65, 66 are sufficiently short to permit the rear ends of the cutter plates to come into engagement upon raising either bed.

Referring again to FIGURES 7*a*–7*d*, the cutting of the tape 32 is effected after locating the tape so that an editing pulse falls directly above the pickup 60. In a similar manner, the tape 33 is cut after aligning an editing pulse thereon with the pickup 61. Since the pickups 60, 61 are spaced apart a distance equal to a predetermined number of editing pulses, the synchronizing signals on the tapes are automatically in phase at the abutting ends of the tapes.

Referring to FIGURE 8, I employ a unique system for automatically indicating when an editing pulse is located above a pickup. In this system, the pickups 60, 61 are subjected to lateral vibrations, as by being coupled at 70 to a vibrator 71 that is connected at 72 to a fixed frequency voltage source, illustrated as an A.C. source 73. By vibrating the pickups 60, 61 in this manner, they are caused to "scan" the video tape placed thereon, and to pick up information recorded on the edge of the tape, i.e., the editing pulses and the synchronizing signal.

The pickups 60, 61 are arranged so that waveforms of signals picked up thereby are displayed by an oscilloscope 74. To this end, the pickups 60, 61 are connected through respective pre-amplifiers 75, 76 and gating amplifiers 77, 78 to the vertical deflection control circuit of the oscilloscope 74. A common output resistor 79 for the gating amplifiers 77, 78 has a sliding contact 80 that is connected to the oscilloscope 74. The sweep circuit of the oscilloscope is connected to the source 73, so that the sinusoidal voltage from the source 73 is utilized to control the horizontal sweep of the beam of the oscilloscope.

My system includes means for permitting only one transducer, i.e., one of the pickups 60, 61 to be coupled to the oscilloscope at any instant. A pulse forming network 85 is coupled at 86 to the source 73, for developing pulses at the peaks of the sinusoidal voltage from the source. Referring to FIGURE 9*a*, there is shown the sinusoidal waveform of the voltage 87 from the source 73. FIGURE 9*b* illustrates pulses 88 that are developed at the positive peaks of the voltage 87, and pulses 89 that are developed at the negative peaks of the voltage 87. It will be apparent that any of a number of conventional circuits may be employed for the pulse forming network 85 to develop pulses at the peaks of a sinusoidal input.

A square wave forming network 84 is employed that is one of the types that responds to spaced positive pulses to develop a square wave voltage 90 (see FIGURE 9*c*). As shown, each positive pulse results in the square wave voltage changing polarity. A suitable circuit for the square wave forming network 84 may be one employing a bi-stable multivibrator that is capable of developing a positive voltage when in one state, and developing a negative voltage when in its other state.

The gating amplifiers 77, 78 are connected at 91, 92 to the square wave forming network 84, and they are arranged so that one gating amplifier 77 is gated on during the positive halves of the square wave 90, and the other gating amplifier 78 is gated on during the negative half cycles of the square wave 90. In this manner, only one gating amplifier at a time can be coupled to the resistor 79, and hence through the sliding contact 80 to the vertical deflection control circuit of the oscilloscope 74.

My system is capable of displaying on the oscilloscope screen 93 the waveforms of voltages derived from the pickup 60, or the pickup 61, or both. In this connection, it will be observed that a full cycle of the source voltage 87 (see FIGURE 9*a*) occurs during each half cycle of the square wave 90, so that the beam sweeps twice across the screen during each cycle of the square wave 90.

The sliding contact 80 (see FIGURE 8) can be positioned as desired to effect the display of the waveforms 94, 95 on the screen 93 for inspection. If the contact 80 is electrically centered along the resistor 79, the waveforms 94, 95 are superimposed. By setting the sliding contact 80 to either side of the electrical center of the resistor 79, the waveforms 94, 95 will be separated vertically on the screen as shown in FIGURE 8. How this feature is utilized to aid in automatically checking the correctness of a splice will be made more evident hereinafter.

A further aid in effecting the desired displays on the screen of the oscilloscope 74 is a blanking control means to permit the beam to impinge upon the screen 93 only during half of each half cycle of the square wave 90. To this end, there is provided a square wave forming network 96 connected to the pulse forming network 85, and which is connected at 97 to the grid circuit of the oscilloscope 74. The square wave forming network 96 is the type adapted to develop a square wave voltage 99 (see FIGURE 9*d*) wherein the duration of each half cycle is dictated by the time between successive positive and negative pulses 88, 89. As will be seen by inspection of FIGURES 9*c* and 9*d*, the square wave voltage 99 is double the frequency of the square wave voltage 90. The square wave voltage 99 is utilized so that, during the negative half cycles thereof, the electron beam is prevented from impinging upon the screen 93. Thus, the positive half cycles of the blanking voltage 99 represent the periods during which the beam sweeps across the screen 93, and the negative half cycles are periods during which the beam is blanked.

The pickups 60, 61 are arranged to be moved only short distances on either side of their neutral positions, but such distances are greater than the width of an editing pulse. For example, where editing pulses 0.004" wide are involved, the heads may be vibrated so that they move a total distance of 0.020", i.e., 0.010" on either side of their neutral positions.

In splicing video tape by the method and system of my invention, when the bed 16 (see FIGURE 7*a*) is raised and the end of the tape 32 is located on the bed 15 so that the end thereof extends past the cutter plate 25, the tape 32 is longitudinally adjusted by hand until an editing pulse is located within the scan range of the pickup 60. When the tape 32 is thus positioned, pulses 100 (see FIGURE 9*e*) are developed by the pickup 60 and fed through the pre-amplifier 75 to the gating amplifier 77. As will be apparent, a pulse 100 occurs twice during each cycle of movement of the pickup 60, i.e., each time the pickup 60 sweeps past the editing pulse. Thus, two pulses 100 occur during each half cycle of the square wave 90, so that the two pulses 100 that occur during the positive half cycles of the square wave 90 are presented to the input of the gating amplifier 77 during the time that it is gated on. Such pulses are applied through the sliding contact 80 to the oscilloscope 74. However, only the pulse 100 that occurs during the positive half cycle of the blanking voltage 99 is displayed on the screen 93. Thus, and referring to FIGURE 9*g*, only one pulse 100 occurring during alternate cycles of the blanking voltage 99 is displayed by the oscilloscope. The waveform 95 shown on the screen in FIGURE 8 is the trace of the pulses 100 of FIGURE 9*g* that occur during the alternate half cycles of the blanking voltage 99.

When the trace 95 appears on the screen 93, the tape 32 is cut in the manner heretofore described, and as illustrated in FIGURES 7*a* and 7*b*. Thereafter, the tape 33 is placed on the bed 16 and adjusted until the trace 94 on the screen 93 shows that the pickup 61 is sweeping back and forth past an editing pulse, whereupon the end of the tape 33 is cut as previously described. As in the case described for the pickup 60, the pickup 61 causes pulses 101 (see FIGURE 9*f*) to be developed and fed through the pre-amplifier 76 to the gating amplifier 78. One of the pulses 101 occurs during each cycle of movement of the pickup 61, i.e., during each half cycle of the blanking voltage 99. Since the gating amplifier 78 is gated on only during the negative half cycles of the square wave 90, only the pulses 101 occurring during such portions of the square wave 90 are available to be applied to the oscilloscope 74. However, only the pulses 101 (see FIGURE 9*h*) that occur during the positive half cycles of the blanking voltage 99 are traced out on the screen 93. The waveform 94 shown on the screen 93 depicts the trace of these pulses 101. With the pulses 101 being traced on the screen 93 in this manner, the bed 15 is operated to cut the tape 33.

When the tapes 32, 33 have been cut, and the beds 15, 16 are aligned in the positions shown in FIGURE 7*d*, the oscilloscope 74 shows both the traces 94, 95. As will be apparent, alignment of the pulse traces 94, 95 shows that respective editing pulses scanned by the pickups 60, 61 are in the same positions relative to the pickups, i.e., the alignment of the pulse traces 94, 95 results from the relative positions of the pickups 60, 61 and the editing pulses scanned thereby being precisely the same.

To further aid one in cutting tapes to be spliced in accordance with my invention, the oscilloscope face may be provided with a fixed index, as indicated at 103. When the first tape 32 is to be cut (see FIGURE 7*a*) it is adjusted relative to the pickup 60 until the pulse trace 95 is centered with respect to the index 103. Thereafter, when the tape 33 is positioned to be cut, it is adjusted relative to the pickup 61 until the pulse trace 94 is centered with respect to the index 103. By this means, the subsequent checking of the splice shows both traces 94, 95 centered with respect to the index 103, and also signifies that respective editing pulses are precisely positioned above the pickups.

FIGURE 6 illustrates a means of my invention for vibrating the pickups 60, 61. Such means comprises a circular magnetizable element 105 of U-shaped cross section, and a permanent magnet 106 centered therein. Surrounding the magnet 106, and spaced between the confronting surfaces of the magnet 106 and the element 105 is a nonmagnetic cylindrical spider element 107 which holds the turns of a winding 108. As indicated, the ends of the winding 108 are coupled to the A.C. source. When the cyclical voltage is applied to the winding 108, the interactions between the magnetic field and current flowing through the winding turns causes the winding 108 and the spider 107 to oscillate longitudinally.

To support the spider 107 so that it oscilates in the manner described, I provide a pair of circular, corrugated diaphragms 110, 111 through which the spider 107 extends, and to which the spider is fixed. A ring 112 surrounds the diaphragms 110, 111 and is fixed to their edges so as to hold them in spaced relation. As shown, the magnet 106, the element 105 and the ring 112 are in fixed spaced relation, whereby the diaphragms 110, 111 support the spider 107 so that it can oscillate longitudinally without any danger of binding against the magnet 106 and the element 105.

The oscillating motion of the spider 107 is imparted to the lower end of the T-shaped element 62 that carries the pickups 60, 61. For this purpose, the outer end of the spider 107 is capped by a disk element 113 that has a central rod 114 extending therefrom. The rod 114 is secured to the lower end of the T-shaped element 62. Thus, as the spider 107 vibrates longitudinally from a neutral position at the frequency of the voltage from the source 73, the lower end of the T-shaped element 62 is caused to vibrate therewith. Such vibrations are transmitted through the T-shaped element 62, to cause the pickups 60, 61 to vibrate at that frequency. However, due to the fact that the element 62 is pivotally mounted adjacent its upper end, the relatively large movements of the lower end of the element 62 are reflected, by lever action, in relatively small movements for the pickups 60, 61.

Splicing video tape will be seen to be made quick and easy by my invention. In contrast to the one-half hour or so needed to make a splice with prior art apparatus and techniques, a splice can be effected by my apparatus and method in about twelve seconds. In addition to this tremendous saving in time, my invention insures that the splice is located in precisely the correct position, a feat that is all but impossible with prior art techniques.

While I have illustrated and described a particular form of cutting apparatus for my invention, and a method and a system for facilitating the splicing of tape, it will be apparent that various modifications can be made therein without departing from the spirit and scope of my invention. For example, the signals passed by the gating amplifiers may be of both an editing pulse and a small portion of the synchronizing signal on either side thereof, or only of an editing pulse alone. For the latter, the pre-amplifiers are designed to pass only signals of the order of frequency of the pulses developed from an editing pulse. Accordingly, I do not intend that my invention be limited, except as by the appended claims.

I claim:

1. Measuring apparatus for locating objects so that respective magnetic particles thereon are a predetermined distance apart comprising; a pair of magnetic transducers spaced apart the predetermined distance; means for vibrating said transducers in unison while maintaining the spacing therebetween, said transducers developing respective signals when the objects are located with their particles adjacent said transducers; and means coupled to said transducers and to said vibrating means to develop indications when said signals are equal in magnitude.

2. The method of cutting a pair of tapes to be spliced, wherein the tapes have longitudinally spaced magnetic lines thereon, the spacing between the lines on the tapes being the same, comprising the steps of: sequentially supporting the tapes on respective sides of a cutting line, with the ends thereof extending past the cutting line; providing signal indications of a respective magnetic line on each tape, wherein said respective magnetic lines are spaced apart a multiple of the distance between adjacent magnetic lines; selectively adjusting the tapes until said signals are equal in magnitude; and cuting the tapes along said cutting line.

3. In combination: a pair of transducers; a rod-like element supporting said transducres in fixed spaced relation at its opposite ends; in elongated elements secured at one end to the middle of said rod-like element; means supporting said elongated element adjacent said one end for pivotal movement; and means coupled to the opopsite end of said element for vibrating said element.

4. The method of cutting a pair of tapes to be spliced, wherein the tapes have longitudinally spaced magnetic lines thereon, the spacing between the lines on the tapes being the same, comprising the steps of: sequentially supporting the tapes on respective sides of a cutting line, with the ends thereof extending past the cutting line; sequentially developing observable indications of respective magnetic lines on opposite sides of the cutting line which are spaced apart a precise multiple of the distance between adjacent magnetic lines; adjusting the tapes in position until said indications are equal in magnitude; and cutting the tapes along said cutting line.

5. Apparatus for detecting the location of a magnetic particle on an object comprising: a transducer device; means to vibrate said transducer device to cause it to scan the surface of the object and to develop signals when the object is positioned with the magnetic particle adjacent the transducer device; a source of voltage of predetermined frequency coupled to the vibrating means; means to develop a square wave of half said frequency; a gating circuit coupled to said transducer device and to said square wave forming means, said gating circuit being operable to provide an output during only half of each cycle of the square wave; and oscilloscope means for displaying a trace of said output.

6. In tape splicing apparatus for video tapes to be cut and spliced together, wherein the tapes have longitudinally spaced invisibl magnetic lines thereon, and wherein the same spacing of the magnetic lines is to be maintained across the splice line, a system for permitting precise locating of the tapes relative to the splice line comprising: a pair of transducers on opposite sides of the cutting line, said transducers being spaced apart a predetermined number of magnetic lines; means for vibrating the transducers in unison; cutting appratus including means to support the tapes so they engage the respective transducers, and to permit the tapes to be adjustably positioned with their ends extending past the cutting line and so that respective magnetic lines thereon are in the paths of movement of said transducers; means coupled to said transducers and to said means for vibrating them to develop signals indicating when the respective magnetic lines are in the paths of movement of said transducers; and means in said cutting apparatus to cut the tapes along the splice line when said indication exists.

7. In tape splicing apparatus for video tapes to be cut and spliced together, wherein the tapes have longitudinally spaced magnetic lines thereon, and wherein the same spacing of the magnetic lines is to be maintained across the splice line, a system for permitting precise locating of the tapes relative to a cutting line comprising: a pair of transducers on opposite sides of the cutting line, said transducers being spaced apart a predetermined number of magnetic lines; means for vibrating the transducers in unison; means to support the tapes so they engage the respective transducers, and to permit the tapes to be adjustably positioned with their ends extending past the cutting line and so that respective magnetic lines thereon are in the paths of movement of said transducers; means to cut the tapes along the cutting line; a source of voltage of predetermined frequency coupled to the vibrating means; means to develop a square wave of half said frequency; a respective gating circuit coupled to each transducer and to said square wave developing means, said gating circuits being rendered alternately conductive by said square wave; and oscilloscope means adapted to display a trace of signals from each gating circuit during conduction thereof.

8. The combination defined in claim 6, wherein said signal developing means includes a source of voltage of predetermined frequency coupled to the vibrating means; means to develop a square wave of half said predetermined frequency; a respective gating circuit coupled to each transducer and to said square wave developing means, said gating circuits being rendered alternately conductive by said square wave; means to develop a square wave of said predetermined frequency; and oscilloscope means having a sweep circuit coupled to said source, a blanking control circuit coupled to said means for developing the square wave of said predetermined frequency, and a vertical deflection control circuit coupled to said gating circuits.

9. The combination defined in claim 8, wherein the square wave of said predetermined frequency and the source voltage are 90° out of phase.

10. In a tape splicing apparatus for video tapes to be cut and spliced together, wherein the tapes have longitudinally spaced invisible magnetic lines thereon, and wherein the same spacing of the magnetic lines is to be maintained across the splice line, a system for permitting precise locating of the tapes relative to a cutting line comprising: a pair of transducers on opposite sides of the cutting line, said transducers being spaced apart a predetermined number of magnetic lines; means for vibrating the transducers in unison; means to support the tapes so they engage the respective transducers, and to permit the tapes to be adjustably positioned with their ends extending past the cutting line and so that respective magnetic lines thereon are in the paths of movement of said transducers; and means coupled to said transducers and to said means for vibrating them to develop signals indicating when the respective magnetic lines are in the paths of movement of said transducers.

11. In a tape splicing apparatus for video tapes to be cut and spliced together, wherein the tapes have longitudinally spaced magnetic lines thereon, and wherein the same spacing of the magnetic lines is to be maintained across the splice line, a system for permitting precise locating of the tapes relative to a cutting line comprising: a pair of transducers on opposite sides of the cutting line, said transducers being spaced apart a predetermined number of magnetic lines; means for vibrating the transducers in unison; means to support the tapes so they engage the respective transducers, and to permit the tapes to be adjustably positioned with their ends extending past the cutting line and so that respective magnetic lines thereon are in the paths of movement of said transducers; a source of voltage of predetermined frequency coupled to the vibrating means; means to develop a square wave of half said frequency; a gating circuit coupled to each transducer and to said square wave developing means, said gating circuits being rendered alternately conductive by said square wave; and oscilloscope means adapted to display a trace of signals from each gating circuit during conduction thereof.

12. The combination defined in claim 10, wherein said signal developing means includes a source of voltage of predetermined frequency coupled to the vibrating means; means to develop a square wave of half said predetermined frequency; a gating circuit coupled to each transducer and to said square wave developing means, said gating circuits being rendered alternately conductive by said square wave; means to develop a square wave of said predetermined frequency; and oscilloscope means having a sweep circuit coupled to said source, a blanking control circuit coupled to said means for developing the square wave of said predetermined frequency, and a vertical deflection control circuit coupled to said gating circuits.

References Cited in the file of this patent

UNITED STATES PATENTS

| | | |
|---|---|---|
| 1,805,399 | Hendrick | May 12, 1931 |
| 2,128,147 | Huber | Aug. 23, 1938 |
| 2,345,450 | Blanc | Mar. 28, 1944 |
| 2,588,386 | Hubbard | Mar. 11, 1952 |
| 2,721,602 | Castedello | Oct. 25, 1955 |
| 2,744,224 | Bode | May 1, 1956 |
| 2,793,344 | Reynolds | May 21, 1957 |
| 2,814,343 | Anderson | Nov. 26, 1957 |
| 2,837,706 | Glassey | June 3, 1958 |
| 2,914,756 | Heidenhain | Nov. 24, 1959 |
| 2,923,195 | Reibel | Feb. 2, 1960 |

OTHER REFERENCES

Thoburn: Rev. Sci. Instr., vol. 29, pp. 990–992 (November 1958).